(12) United States Patent
Song et al.

(10) Patent No.: US 12,305,660 B2
(45) Date of Patent: May 20, 2025

(54) FAN DEVICE WITH STABILITY MAINTENANCE ASSEMBLY

(71) Applicant: VAST GLORY ELECTRONICS & HARDWARE & PLASTIC(HUI ZHOU) LTD., Hui Zhou (CN)

(72) Inventors: San-Qiang Song, Hui Zhou (CN); Dian Sheng Liu, Hui Zhou (CN); Shi Man Xu, Hui Zhou (CN)

(73) Assignee: VAST GLORY ELECTRONICS & HARDWARE & PLASTIC(HUI ZHOU) LTD., Hui Zhou (CN)

( * ) Notice: Subject to any disclaimer, the term of this patent is extended or adjusted under 35 U.S.C. 154(b) by 139 days.

(21) Appl. No.: 17/859,746

(22) Filed: Jul. 7, 2022

(65) Prior Publication Data

US 2023/0184262 A1    Jun. 15, 2023

(30) Foreign Application Priority Data

Dec. 9, 2021   (CN) .......................... 202111499795.1

(51) Int. Cl.
| | |
|---|---|
| *F04D 29/056* | (2006.01) |
| *F04D 25/06* | (2006.01) |
| *F04D 29/058* | (2006.01) |
| *F04D 29/66* | (2006.01) |
| *H02K 5/16* | (2006.01) |
| *H02K 7/08* | (2006.01) |
| *H02K 21/22* | (2006.01) |

(52) U.S. Cl.
CPC ......... *F04D 29/056* (2013.01); *F04D 25/062* (2013.01); *F04D 29/058* (2013.01); *F04D 29/668* (2013.01); *H02K 5/163* (2013.01); *H02K 7/085* (2013.01); *H02K 21/22* (2013.01)

(58) Field of Classification Search
CPC .. F04D 29/668; F04D 25/062; F04D 25/0613; F04D 25/0606; F04D 25/06; F04D 29/056–29/059; F04D 29/046–29/049; F04D 13/0673; H02K 5/163; H02K 7/085; H02K 21/22
USPC ...................................... 417/423.12
See application file for complete search history.

(56) References Cited

U.S. PATENT DOCUMENTS

| | | | |
|---|---|---|---|
| 6,849,978 B2* | 2/2005 | Sun ...................... | F04D 29/058 310/90 |
| 2016/0312826 A1* | 10/2016 | Kawashima .......... | F04D 19/042 |

(Continued)

*Primary Examiner* — Bryan M Lettman
(74) *Attorney, Agent, or Firm* — Maschoff Brennan

(57) ABSTRACT

A fan device includes a frame, a stability maintenance assembly, a shaft, an impeller, and a driving assembly. The frame includes a base and a bearing seat protruding from the base and having an accommodation space. The stability maintenance assembly is disposed in the accommodation space and includes a bearing and a magnet arranged coaxially. The bearing is located above the magnet and magnetized by the magnet. The shaft is disposed through the magnet and the bearing. The impeller is fixed to the shaft so as to be rotatable relative to the frame via the shaft and the bearing. The driving assembly includes a stator and a rotor. The stator is sleeved on the bearing seat of the frame, the rotor is mounted on the impeller and surrounds the stator, and the driving assembly is configured to drive the impeller to rotate relative to the frame.

6 Claims, 6 Drawing Sheets

(56) References Cited

U.S. PATENT DOCUMENTS

2019/0305627 A1\* 10/2019 Yoshino .............. F04D 25/0646
2021/0148368 A1\* 5/2021 Quinones .............. F04D 29/282

\* cited by examiner

FAN DEVICE WITH STABILITY MAINTENANCE ASSEMBLY

CROSS-REFERENCE TO RELATED APPLICATIONS

This non-provisional application claims priority under 35 U.S.C. § 119(a) on Patent Application No(s). 202111499795.1 filed in China on Dec. 9, 2021, the entire contents of which are hereby incorporated by reference.

TECHNICAL FIELD

The disclosure relates to a fan device, more particularly to a fan device having a magnet.

BACKGROUND

In general, a notebook computer has a fan disposed therein so as to dissipate heat in the notebook computer. As the technology progresses, the performance of the notebook computer has been increased, but the higher performance the notebook computer has, the more heat the notebook computer generates. Therefore, the rotation speed of the fan is increased to enhance the heat dissipation efficiency.

However, high rotation speed of the fan may result in louder noise and larger vibration, causing a user of the notebook computer to feel uncomfortable. In order to reduce the noise of the fan, the fan does not always operate in high rotation speed. The fan generally decelerates when the notebook computer is in low load, while accelerates when the notebook computer is in high load. However, during the acceleration and deceleration of the fan, an impeller may rotate unsmoothly, which may also cause noise and vibration.

SUMMARY

The disclosure provides a fan device which enables an impeller thereof to rotate smoothly.

One embodiment of the disclosure provides a fan device. The fan device includes a frame, a stability maintenance assembly, a shaft, an impeller, and a driving assembly. The frame includes a base and a bearing seat, and the bearing seat protrudes from the base and has an accommodation space. The stability maintenance assembly is disposed in the accommodation space and includes a bearing and at least one magnet which are arranged coaxially. The bearing is located above the magnet, and the bearing is magnetized by the magnet. The shaft is disposed through the magnet and the bearing so as to be rotatable relative to the frame. The impeller is fixed to the shaft so as to be rotatable relative to the frame via the shaft and the bearing. The driving assembly includes a stator and a rotor. The stator is sleeved on the bearing seat of the frame, the rotor is mounted on the impeller and surrounds the stator, and the driving assembly is configured to drive the impeller to rotate relative to the frame.

Another embodiment of the disclosure provides a fan device. The fan device includes a frame, a stability maintenance assembly, a shaft, an impeller, and a driving assembly. The frame includes a base and a bearing seat, and the bearing seat protrudes from the base and has an accommodation space. The stability maintenance assembly is disposed in the accommodation space and includes a bearing and at least one magnet which are arranged coaxially. The magnet is located above the bearing, and the bearing is magnetized by the magnet. The shaft is disposed through the magnet and the bearing so as to be rotatable relative to the frame. The impeller is fixed to the shaft so as to be rotatable relative to the frame via the shaft and the bearing. The driving assembly includes a stator and a rotor. The stator is sleeved on the bearing seat of the frame, the rotor is mounted on the impeller and surrounds the stator, and the driving assembly is configured to drive the impeller to rotate relative to the frame.

According to the fan devices as discussed in the above embodiments, since the magnet is entirely or partially located between the first side surface and the first end surface, or the magnet is entirely or partially located between second side surface and the second end surface, such that the magnet can be located closer to the bearing, thereby facilitating the magnetization of the bearing by the magnet. Since the bearing is magnetized by the magnet, the magnetized bearing can attract the shaft via a magnetic force, such that the impeller is prevented from shaking during operation. In other words, the magnet can facilitate the magnetization of the bearing, such that the fan device can operate smoothly so as to extend the lifespan thereof.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
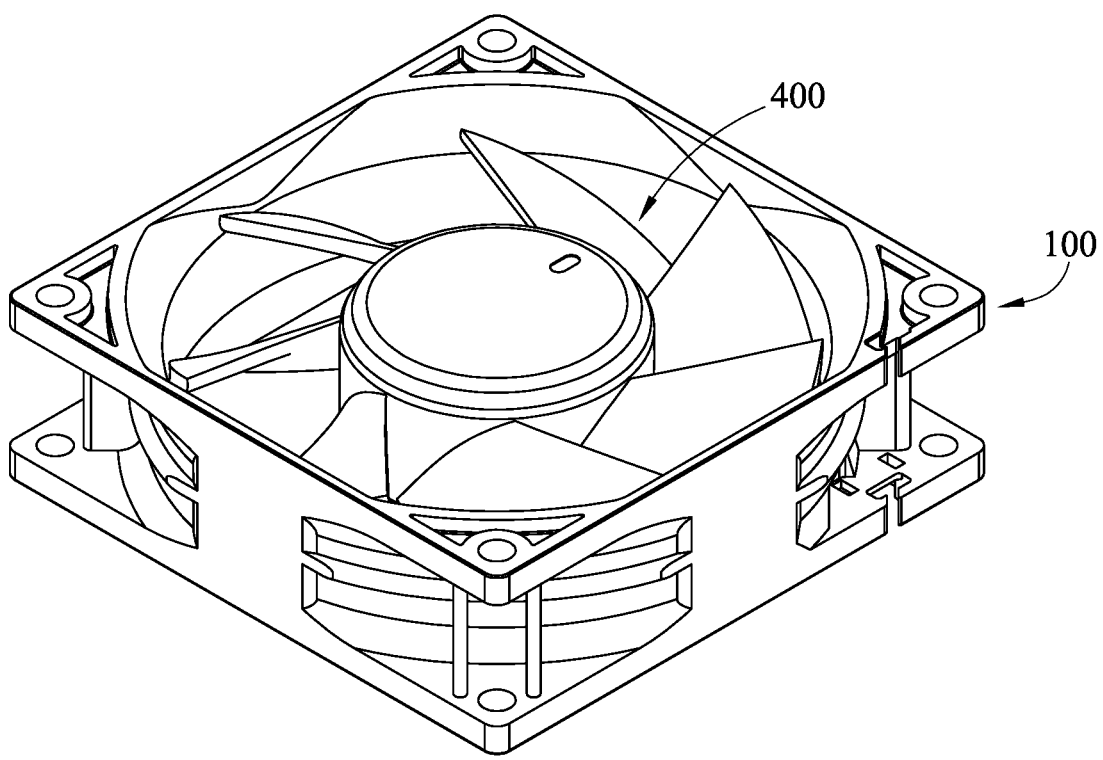
FIG. 1 is a perspective view of a fan device according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
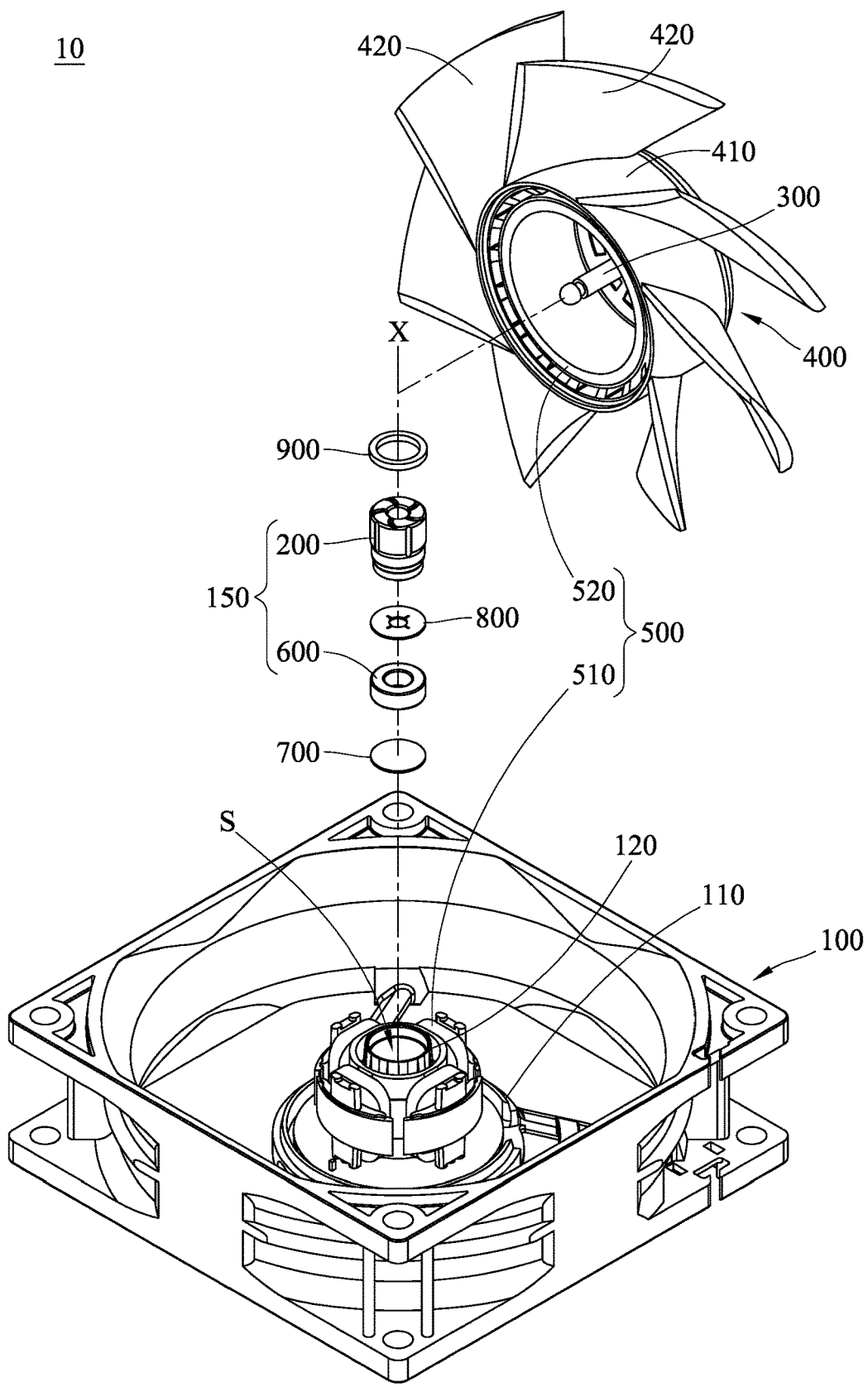
FIG. 2 is an exploded view of the fan device in FIG. 1.
Figure 3:
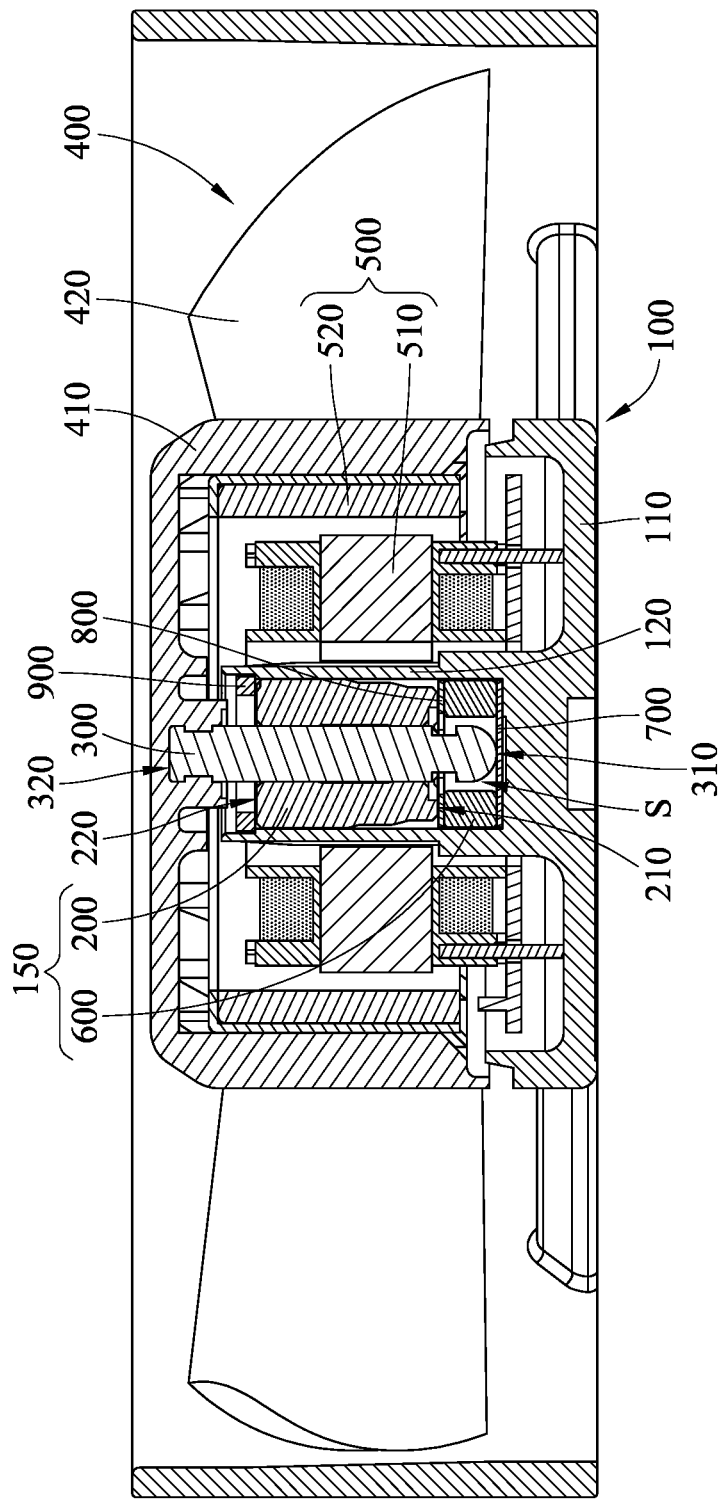
FIG. 3 is a cross-sectional view of the fan device in FIG. 1.

Refer to FIGS. 1 to 3, FIG. 1 is a perspective view of a fan device 10 according to a first embodiment of the disclosure, FIG. 2 is an exploded view of the fan device 10 in FIG. 1, and FIG. 3 is a cross-sectional view of the fan device 10 in FIG. 1.

In this embodiment, the fan device 10 is, for example, an axial fan device. The fan device 10 includes a frame 100, a stability maintenance assembly 150, a shaft 300, an impeller 400, and a driving assembly 500. The frame 100 includes a base 110 and a bearing seat 120. The bearing seat 120 protrudes from the base 110 and has an accommodation space S.

The stability maintenance assembly 150 is disposed in the accommodation space S and includes a bearing 200 and a magnet 600 which are arranged coaxially. The bearing 200 is located above the magnet 600, and the bearing 200 is magnetized by the magnet 600. Specifically, the bearing 200 is located in the accommodation space S of the bearing seat 120. The bearing 200 has a first side surface 210 and a second side surface 220 located opposite to each other in an axial direction X of the bearing 200. The first side surface 210 is located closer to the base 110 than the second side surface 220, and the first side surface 210 faces the magnet 600. The magnet 600 is, for example, in a ring shape.

The shaft 300 is disposed through the magnet 600 and the bearing 200 so as to be rotatable relative to the frame 100. The shaft 300 has a first end surface 310 and a second end surface 320 located opposite to each other along the axial direction X of the bearing 200, and the first end surface 310 is located closer to the first side surface 210 than the second end surface 320. The magnet 600 surrounds the shaft 300, and the magnet 600 is entirely located between the first side surface 210 and the first end surface 310. The impeller 400 is, for example, in axial type. The impeller 400 includes a hub 410 and a plurality of blades 420. The blades 420 are connected to a periphery of the hub 410. The hub 410 is fixed to the shaft 300 so as to be rotatable relative to the frame 100 via the shaft 300 and the bearing 200. The driving assembly 500 includes a stator 510 and a rotor 520. The stator 510, for example, has coils. The stator 510 is sleeved on the bearing seat 120 of the frame 100. The rotor 520 is, for example, a magnet. The rotor 520 is disposed on the impeller 400 and surrounds the stator 510. The driving assembly 500 is configured to drive the impeller 400 to rotate relative to the frame 100.

Since the magnet 600 is in the ring shape, the magnet 600 can be entirely located between the first side surface 210 and the first end surface 310, such that the magnet 600 can be located closer to the bearing 200, thereby facilitating the magnetization of the bearing 200 by the magnet 600. Since the bearing 200 is magnetized by the magnet 600, the magnetized bearing 200 can attract the shaft 300 via a magnetic force, such that the impeller 400 is prevented from shaking during operation. In other words, the magnet 600 located between the first side surface 210 and the first end surface 310 can facilitate the magnetization of the bearing 200, such that the fan device 10 can operate smoothly so as to extend the lifespan thereof.

In this embodiment, the magnet 600 is entirely located between the first side surface 210 and the first end surface 310, but the disclosure is not limited thereto; in some other embodiments, the magnet may be partially located between the first side surface and the first end surface.

In this embodiment, the magnet 600 is in the ring shape and entirely located between the first side surface 210 and the first end surface 310, such that the magnet 600 can be also served as a gasket for facilitating the assembly of the fan device 10.

In this embodiment, the magnet 600 is in a ring shape, and the quantity of the magnet 600 is one, but the disclosure is not limited thereto; in some other embodiments, there may be a plurality of magnets in a block shape, and the magnets may be arranged around the shaft.

In this embodiment, the fan device 10 may further include a wear-resistant gasket 700. The wear-resistant gasket 700 is clamped between the shaft 300 and the base 110 of the frame 100, and a hardness of the wear-resistant gasket 700 is greater than a hardness of the frame 100 for preventing the shaft 300 from wearing the frame 100.

In this embodiment, the fan device 10 may further include a fastener 800 and a positioning ring 900. The fastener 800 is clamped between the bearing 200 and the magnet 600 for preventing the bearing 200 from wearing the magnet 600. The fastener 800 is circumferentially fixed to the shaft 300 so as to limit a movement of the shaft 300 along an axial direction of the shaft 300. The positioning ring 900 is disposed between the second side surface 220 and the second end surface 320 for preventing oil leakage issue.

Figure 4:
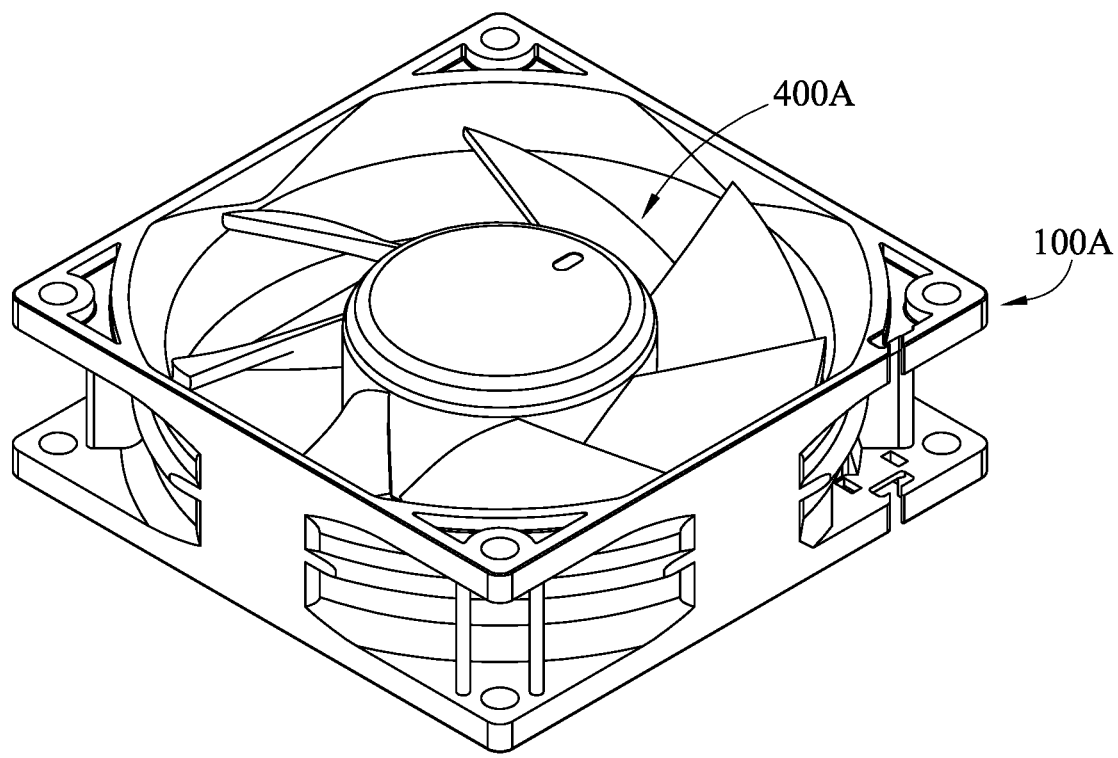
FIG. 4 is a perspective view of a fan device according to a second embodiment of the disclosure.
Figure 5:
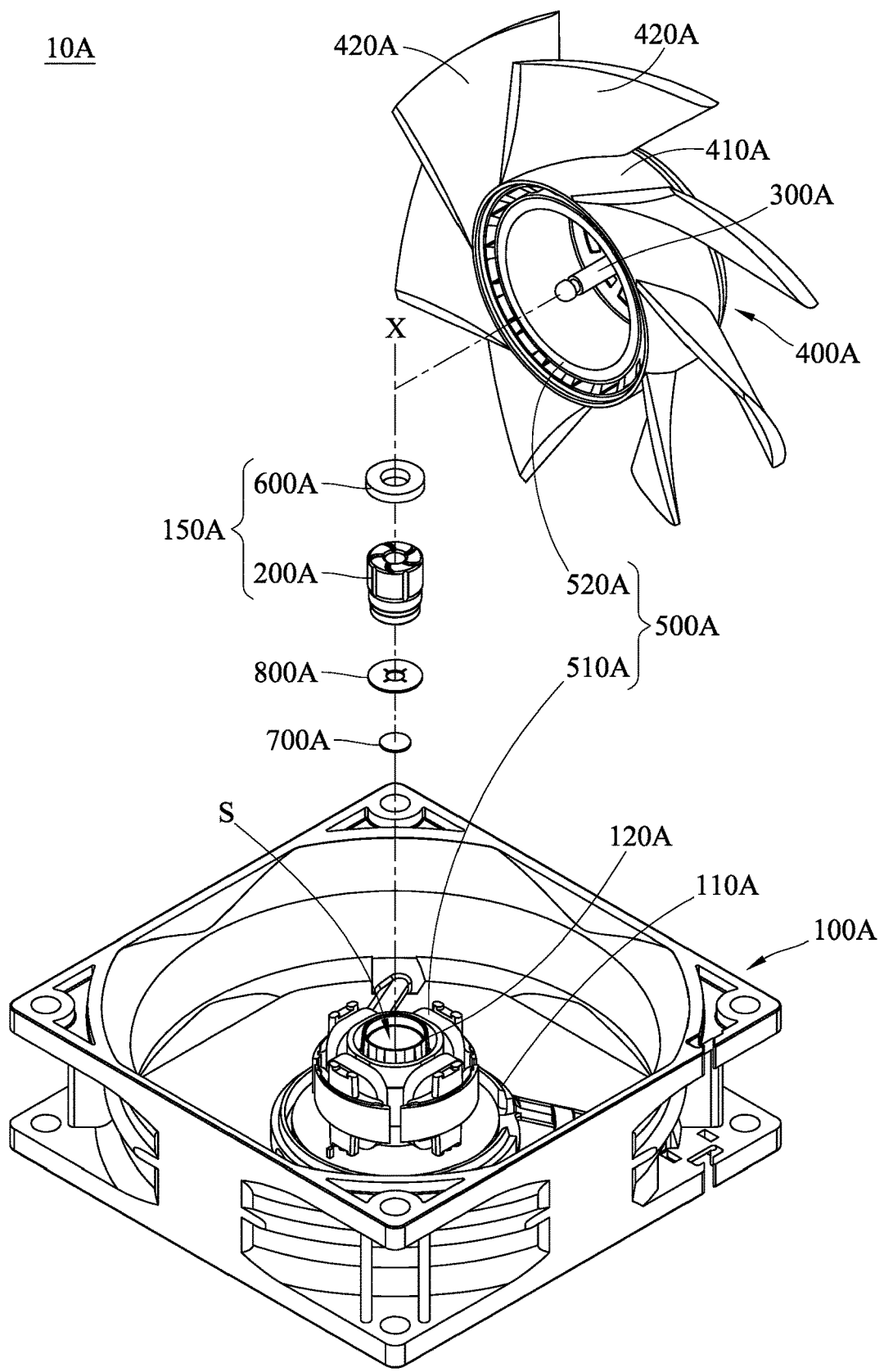
FIG. 5 is an exploded view of the fan device in FIG. 4.
Figure 6:
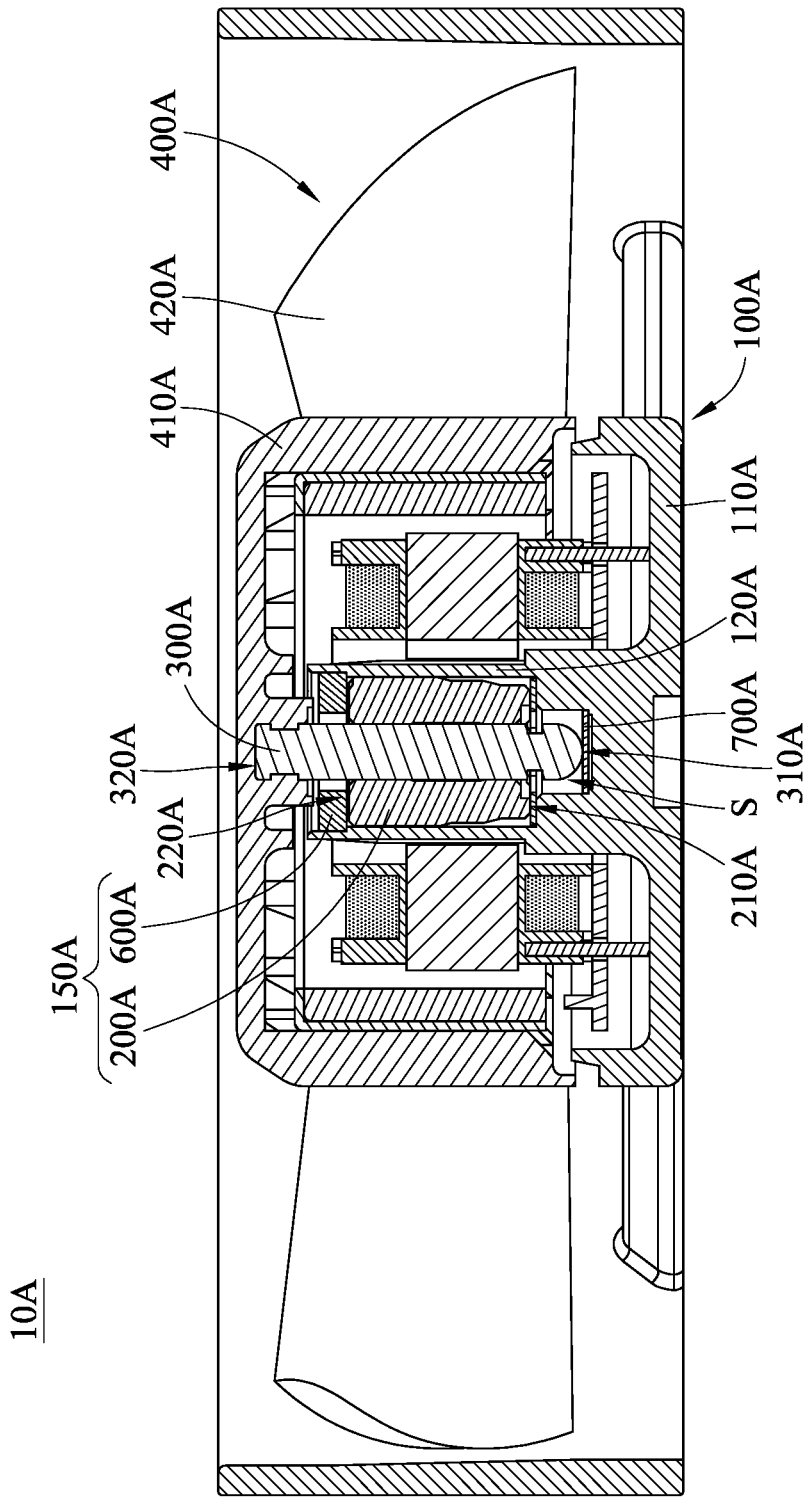
FIG. 6 is a cross-sectional view of the fan device in FIG. 4.

Refer to FIGS. 4 to 6, where FIG. 4 is a perspective view of a fan device 10A according to a second embodiment of the disclosure, FIG. 5 is an exploded view of the fan device 10A in FIG. 4, and FIG. 6 is a cross-sectional view of the fan device 10A in FIG. 4.

In this embodiment, the fan device 10A is, for example, an axial fan device. The fan device 10A includes a frame 100A, a stability maintenance assembly 150A, a shaft 300A, an impeller 400A, and a driving assembly 500A. The frame 100A includes a base 110A and a bearing seat 120A. The bearing seat 120A protrudes from the base 110A and has an accommodation space S.

The stability maintenance assembly 150A is disposed in the accommodation space S and includes a bearing 200A and a magnet 600A which are arranged coaxially. The magnet 600A is located above the bearing 200A, and the bearing 200A is magnetized by the magnet 600A. Specifically, the bearing 200A is located in the accommodation space S of the bearing seat 120A. The bearing 200A has a first side surface 210A and a second side surface 220A located opposite to each other in an axial direction X of the bearing 200A. The first side surface 210A is located closer to the base 110A than the second side surface 220A, and the second side surface 220A faces the magnet 600A. The magnet 600A is, for example, in a ring shape.

The shaft 300A is disposed through the bearing 200A and the magnet 600A so as to be rotatable relative to the frame 100A. The shaft 300A has a first end surface 310A and a second end surface 320A located opposite to each other along the axial direction X of the bearing 200A, and the first end surface 310A is located closer to the first side surface 210A than the second end surface 320A. The magnet 600A surrounds the shaft 300A, and the magnet 600A is entirely located between the second side surface 220A and the second end surface 320A. The impeller 400A is, for example, in axial type. The impeller 400A includes a hub 410A and a plurality of blades 420A. The blades 420A are connected to a periphery of the hub 410A. The hub 410A is fixed to the shaft 300A so as to be rotatable relative to the frame 100A via the shaft 300A and the bearing 200A. The driving assembly 500A includes a stator 510A and a rotor 520A. The stator 510A, for example, has coils. The stator 510A is sleeved on the bearing seat 120A of the frame 100A. The rotor 520A is, for example, a magnet. The rotor 520A is disposed on the impeller 400A and surrounds the stator 510A. The driving assembly 500A is configured to drive the impeller 400A to rotate relative to the frame 100A.

Since the magnet 600A is in the ring shape, the magnet 600A can be entirely located between the second side surface 220A and the second end surface 320A, such that the magnet 600A can be located closer to the bearing 200A, thereby facilitating the magnetization of the bearing 200A by the magnet 600A. Since the bearing 200A is magnetized by the magnet 600A, the magnetized bearing 200A can attract the shaft 300A via a magnetic force, such that the impeller 400A is prevented from shaking during operation. In other words, the magnet 600A located between the second side surface 220A and the second end surface 320A can facilitate the magnetization of the bearing 200A, such that the fan device 10A can operate smoothly so as to extend the lifespan thereof.

In this embodiment, the magnet 600A is entirely located between the second side surface 220A and the second end surface 320A, but the disclosure is not limited thereto; in some other embodiments, the magnet may be partially located between the second side surface and the second end surface.

In this embodiment, the magnet 600A is in the ring shape and entirely located between the second side surface 220A and the second end surface 320A, such that the magnet 600A can be also served as the positioning ring 900 shown in FIG. 3 for preventing oil leakage issue.

In this embodiment, the magnet 600A is in a ring shape, and the quantity of the magnet 600A is one, but the disclosure is not limited thereto; in some other embodiments, there may be a plurality of magnets in a block shape, and the magnets may be arranged around the shaft.

In this embodiment, the fan device 10A may further include a wear-resistant gasket 700A. The wear-resistant gasket 700A is clamped between the shaft 300A and the base 110A of the frame 100A, and a hardness of the wear-resistant gasket 700A is greater than a hardness of the frame 100A for preventing the shaft 300A from wearing the frame 100A.

In this embodiment, the fan device 10A may further include a fastener 800A. The fastener 800A is located closer to the bearing 200A than the wear-resistant gasket 700A; that is, the fastener 800A and the wear-resistant gasket 700A are respectively located at two positions of different heights. The fastener 800A is clamped between the bearing 200A and the frame 100A for preventing the bearing 200 from wearing the frame 100A. The fastener 800A is circumferentially fixed to the shaft 300A so as to limit a movement of the shaft 300A along an axial direction of the shaft 300A.

According to the fan devices as discussed in the above embodiments, since the magnet is entirely or partially located between the first side surface and the first end surface, or the magnet is entirely or partially located between second side surface and the second end surface, such that the magnet can be located closer to the bearing, thereby facilitating the magnetization of the bearing by the magnet. Since the bearing is magnetized by the magnet, the magnetized bearing can attract the shaft via a magnetic force, such that the impeller is prevented from shaking during operation. In other words, the magnet can facilitate the magnetization of the bearing, such that the fan device can operate smoothly so as to extend the lifespan thereof.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A fan device, comprising:
a frame, comprising a base and a bearing seat, wherein the bearing seat protrudes from the base and has an accommodation space;
a stability maintenance assembly, disposed in the accommodation space and comprising a bearing and at least one magnet which are arranged coaxially, wherein the bearing is located above the at least one magnet, and the bearing is magnetized by the at least one magnet;
a shaft, disposed through the at least one magnet and the bearing so as to be rotatable relative to the frame;
an impeller, fixed to the shaft so as to be rotatable relative to the frame via the shaft and the bearing; and
a driving assembly, comprising a stator and a rotor, wherein the stator is sleeved on the bearing seat of the frame, the rotor is mounted on the impeller and surrounds the stator, and the driving assembly is configured to drive the impeller to rotate relative to the frame;
wherein the at least one magnet is located between a side surface of the bearing located closer to the base and an end surface of the shaft located closer to the base; and
wherein the at least one magnet is a magnet ring, a top surface of the magnet ring is located adjacent to the bearing, a bottom surface of the magnet ring is located adjacent to a bottom surface of the accommodation space and substantially coplanar thereto, and a side surface of the magnet ring directly contacts with an inner annular surface of the bearing seat.

2. The fan device according to claim 1, further comprising a wear-resistant gasket, wherein the wear-resistant gasket is clamped between the shaft and the base of the frame, and a hardness of the wear-resistant gasket is greater than a hardness of the frame.

3. The fan device according to claim 1, wherein the stability maintenance assembly further comprises a fastener, the fastener is clamped between the bearing and the at least one magnet and circumferentially fixed to the shaft so as to limit a movement of the shaft along an axial direction of the shaft.

4. The fan device according to claim 1, wherein the stability maintenance assembly further comprises a positioning ring, the positioning ring is disposed in the accommodation space and located above the bearing, and the positioning ring surrounds the shaft.

5. The fan device according to claim 1, wherein the magnet ring comprises a plurality of magnets arranged around the shaft.

6. A fan device, comprising:
a frame, comprising a base and a bearing seat, wherein the bearing seat protrudes from the base and has an accommodation space;
a stability maintenance assembly, disposed in the accommodation space and comprising a bearing and at least one magnet which are arranged coaxially, wherein the bearing is located above the at least one magnet, and the bearing is magnetized by the at least one magnet;
a shaft, disposed through the at least one magnet and the bearing so as to be rotatable relative to the frame;
an impeller, fixed to the shaft so as to be rotatable relative to the frame via the shaft and the bearing; and
a driving assembly, comprising a stator and a rotor, wherein the stator is sleeved on the bearing seat of the frame, the rotor is mounted on the impeller and surrounds the stator, and the driving assembly is configured to drive the impeller to rotate relative to the frame;
wherein the at least one magnet is located radially between the shaft and the stator; and
wherein the at least one magnet is a magnet ring, a top surface of the magnet ring is located adjacent to the bearing, a bottom surface of the magnet ring is located adjacent to a bottom surface of the accommodation space and substantially coplanar thereto, and a side surface of the magnet ring directly contacts with an inner annular surface of the bearing seat.

* * * * *